United States Patent
DeLaFranier et al.

(10) Patent No.: US 9,275,097 B2
(45) Date of Patent: Mar. 1, 2016

(54) SET-ORIENTED LOCKING BASED ON IN-MEMORY BITMAPS FOR A COLUMN-ORIENTED DATABASE

(71) Applicants: Mark DeLaFranier, Waterloo (CA); David Wein, Saint Paul, MN (US); Rolando Blanco, Waterloo (CA); Anil Kumar Goel, Waterloo (CA); Mihnea Andrei, Issy les Moulineaux (FR)

(72) Inventors: Mark DeLaFranier, Waterloo (CA); David Wein, Saint Paul, MN (US); Rolando Blanco, Waterloo (CA); Anil Kumar Goel, Waterloo (CA); Mihnea Andrei, Issy les Moulineaux (FR)

(73) Assignee: Sybase, Inc., Dublin, CA (US)

( * ) Notice: Subject to any disclaimer, the term of this patent is extended or adjusted under 35 U.S.C. 154(b) by 235 days.

(21) Appl. No.: 14/143,874

(22) Filed: Dec. 30, 2013

(65) Prior Publication Data

US 2015/0186448 A1  Jul. 2, 2015

(51) Int. Cl.
*G06F 17/30* (2006.01)
*G06F 11/14* (2006.01)

(52) U.S. Cl.
CPC ...... *G06F 17/30362* (2013.01); *G06F 11/1448* (2013.01); *G06F 17/30309* (2013.01); *G06F 17/30368* (2013.01); *G06F 17/30371* (2013.01); *G06F 17/30312* (2013.01); *G06F 17/30315* (2013.01); *G06F 17/30339* (2013.01); *G06F 2201/80* (2013.01); *G06F 2201/825* (2013.01); *G06F 2201/84* (2013.01); *G06F 2201/87* (2013.01)

(58) Field of Classification Search
CPC .......... G06F 17/30368; G06F 17/30312; G06F 17/30315; G06F 17/30339; G06F 17/30362; G06F 2201/865; G06F 2201/80; G06F 2201/87
See application file for complete search history.

(56) References Cited

U.S. PATENT DOCUMENTS

| | | | |
|---|---|---|---|
| 5,414,834 A | 5/1995 | Alexander et al. | |
| 5,717,919 A | 2/1998 | Kodvalla et al. | |
| 5,794,229 A | 8/1998 | French et al. | |
| 5,832,484 A | 11/1998 | Sankaran et al. | |
| 5,899,988 A * | 5/1999 | Depledge | G06F 17/30312 |
| 5,918,225 A | 6/1999 | White et al. | |
| 6,195,656 B1 * | 2/2001 | Ozbutun | G06F 17/30324 |
| 6,457,021 B1 | 9/2002 | Berkowitz et al. | |
| 6,606,626 B1 | 8/2003 | Ponnekanti | |
| 7,844,782 B2 | 11/2010 | Pope et al. | |
| 8,370,316 B2 | 2/2013 | Bensberg et al. | |
| 8,543,538 B2 | 9/2013 | Frantz et al. | |
| 2009/0037367 A1 | 2/2009 | Wein | |
| 2010/0287346 A1 | 11/2010 | Schreter | |
| 2011/0029569 A1 | 2/2011 | Ganesh et al. | |
| 2011/0161379 A1 | 6/2011 | Plattner et al. | |
| 2012/0323873 A1 | 12/2012 | Mistry et al. | |
| 2014/0089539 A1 | 3/2014 | Hudzia et al. | |

* cited by examiner

Primary Examiner — Cheryl Lewis
(74) *Attorney, Agent, or Firm* — Sterne, Kessler, Goldstein & Fox P.L.L.C.

(57) ABSTRACT

A set-oriented locking based on in-memory bitmap for a column store database is described. An example method includes establishing a column-based in-memory database including a main store and a delta store, where the delta store has a plurality of row-visibility lock bitmaps visible to transactions at various points in time. The lock bitmaps represent a bit encoding to indicate whether there are granted row locks tables in the database. A delete or an update statement is executed with a transaction on a table. A set of row locks on rows of the table manipulated by the delete or the update statement are requested to preclude other transactions from currently deleting or updating the same rows. Accordingly, set operations are performed on the lock bitmap to manage the set of row locks associated with the transaction.

15 Claims, 10 Drawing Sheets

SET-ORIENTED LOCKING BASED ON IN-MEMORY BITMAPS FOR A COLUMN-ORIENTED DATABASE

CROSS-REFERENCE TO RELATED APPLICATION

This application is related to Non-Provisional application Ser. No. 13/960,335, filed Aug. 6, 2013, entitled "DELTA STORE GIVING ROW-LEVEL VERSIONING SEMANTICS TO A NON-ROW-LEVEL VERSIONING UNDERLYING STORE," which is incorporated by reference herein in its entirety.

BACKGROUND

In modern computer architectures, fast communication among multi-core processors makes parallel processing possible. Because large main memory configurations are commercially available and affordable, server setups with hundreds of cores and several terabytes of main memory may also be a reality.

High performance database systems, such as in-memory databases, are adapted to make use of the main memory provided by modern hardware. In such systems, relevant data may be kept in main memory, so that read operations can be executed without disk I/O. The systems are designed to reduce the number of CPU cache misses and avoid CPU stalls because of memory access. One approach for achieving this goal is using column-based storage in memory, which leads to high spatial locality of data and instructions, so the operations can be executed completely in the CPU cache without costly random memory accesses.

In a column-based storage, the entries of a column are stored in contiguous memory locations. Columnar data storage allows efficient compression, such that the relevant data can be stored in main memory with less cost because of data compression. The data structure that contains the main part of the data is called the main storage. The changes are taken over from the delta storage asynchronously at some later point in time. The separation into main and delta storage allows high compression and high write performance at the same time. The column store may implement MVCC (Multi Version Concurrency Control), which is based on having multiple versions of the same data in the database. When reading data it ensures that the operation reads the right set of versions required to get a correct and consistent view of the database. A Consistent View Manager may determine which version each operation is allowed to see depending on the current transaction isolation level.

The column store may use a delta storage—an in-memory data store that implements row-level versioning that is optimized to support real time data ingestion—to provide a high level of transaction concurrency through MVCC. In order to support these design objectives, a high performance locking mechanism is required to provide row level locking capabilities. However, existing approaches for managing locks via a lockless data structure requires excessive resources in acquiring and releasing locks. Therefore, existing approaches suffer from performance and scalability issues.

BRIEF DESCRIPTION OF THE DRAWINGS/FIGURES

Embodiments are described, by way of example only, with reference to the accompanying drawings. In the drawings, like reference numbers generally indicate identical or functionally similar elements. The drawing in which an element first appears is typically indicated by the leftmost digit or digits in the corresponding reference number.

DETAILED DESCRIPTION

Provided herein are system, method and/or computer program product embodiments, and/or combinations and subcombinations thereof, for providing set-oriented locking based on in-memory bitmaps for a column-oriented database. As will be described in further detail below, embodiments can implement a main store, a delta store, and/or an in-memory bitmap to represent row locks on the rows of a table. Embodiments can further track granted row locks on the rows of the table using a public or global lock bitmap visible to some or even all transactions, and track row locks on rows to be deleted or updated in a transaction using a private lock bitmap visible (in some embodiments) to only that transaction. Embodiments enable set operations, such as but not limited to binary operations AND, OR, XOR or NOT, on the lock bitmaps to acquire locks, track lock ownership, detect conflicts and release locks. Accordingly, locking mechanism utilizing set-based operations enables efficient resource usage and bulk operations that maximize performance.

Figure 1:
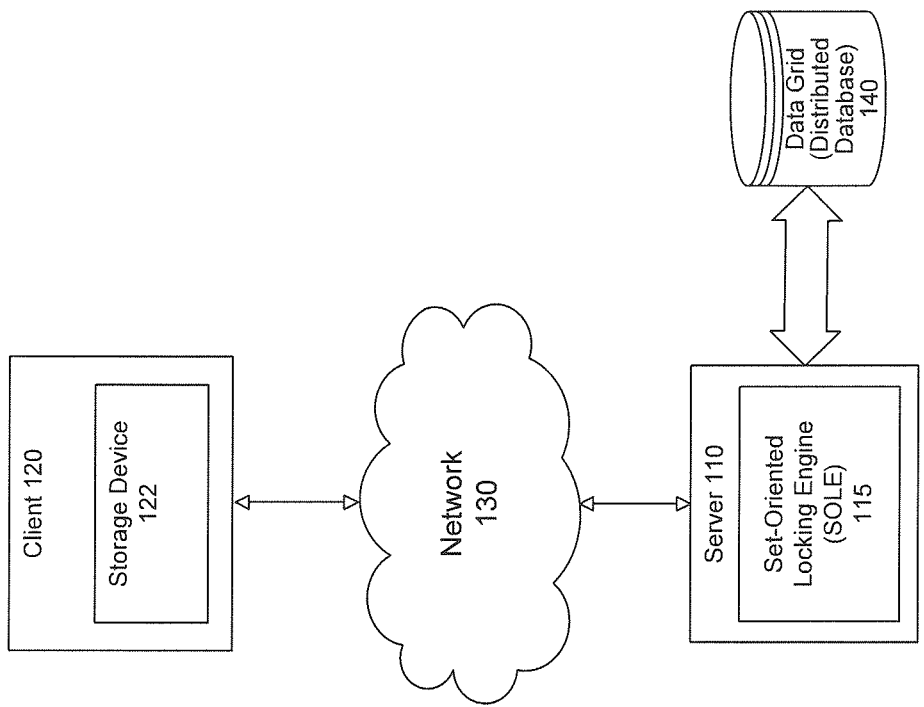
FIG. 1 illustrates a client/server system, according to an embodiment.

FIG. 1 illustrates a client/server system 100. System 100 includes a server 110, a Set-Oriented Locking Engine (SOLE) 115, a client 120, a network 130, and a database 140.

Client 120 communicates with server 110 over the network 130. Although only one client 120 is shown, more clients may be used as necessary. Specifically, client 120 may be contained/hosted within a Database Management System (DBMS) (not shown) on server 110 via network 130. The network 130 includes functionality for packaging client calls in the well-known Structured Query Language (SQL) together with any parameter information into a format (of one or more packets) suitable for transmission to the DBMS. Client 120 may send SQL statements to server 110 and receive query results from server 110. Although only one server 110 is shown, more servers may be used as necessary. Network 130 may be any network or combination of wired and wireless networks that carry data communication. Such networks can include, but is not limited to, a local area network, medium area network, and/or wide area network such as the Internet.

Server 110 can host SOLE 115. As illustrated in FIG. 1, client 120 can send data requests to server 110, which can in turn invoke SOLE 115 for further processing. SOLE 115 can be software, firmware, or hardware or any combination thereof in a computing device. System 100 can be implemented on or implemented by one or more computing devices.

Figure 2:
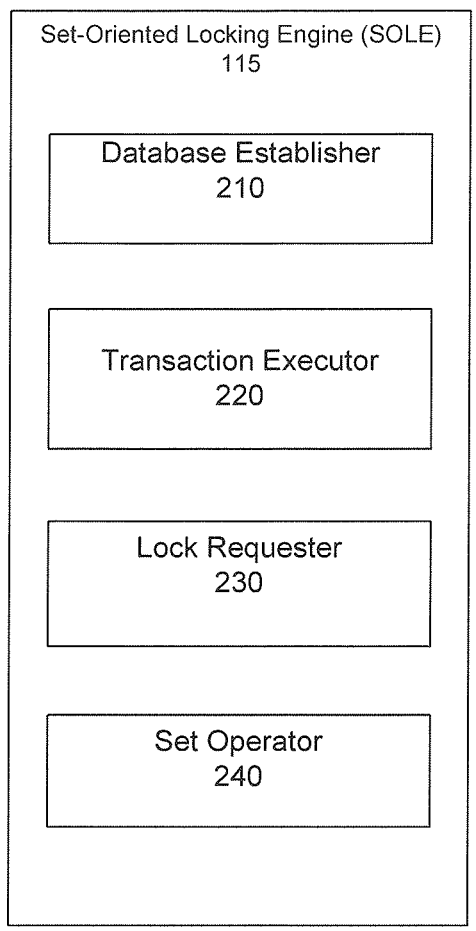
FIG. 2 illustrates elements of a Set-Oriented Locking Engine (SOLE), according to an embodiment.

FIG. 2 illustrates elements of a Set-Oriented Locking Engine (SOLE), according to an embodiment. In the example shown in FIG. 2, SOLE 115 includes database establisher 210, transaction executor 220, lock requester 230, and set operator 240.

Database establisher 210 establishes a column-based in-memory database including a main store and a delta store, where the delta store has a plurality of row-visibility lock bitmaps visible to transactions at various points in time. The lock bitmaps represent a bit encoding to indicate whether there are granted row locks on rows within tables in the database. In an embodiment, main store may not allow concurrent transactions on a same table. In another embodiment, the delta store has a plurality of row-visibility bitmaps implementing a row-level versioning mechanism that allows concurrent transactions on the same table. In still another embodiment, the table has a public lock bitmap, representing granted row locks on the table visible to transactions globally. In some embodiments, database establisher 210 may establish a row-oriented data store, which allows concurrent transactions on the same row of the table.

Transaction executor 220 executes within a transaction, such as a delete or an update statement on a table, where the table has a lock bitmap visible to the transaction at time of execution. In an embodiment, the table has a plurality of table versions that provide transaction-consistent snapshots of the table visible to the transaction at various points in time. In another embodiment, the table versions are represented by bitmaps in the delta store. In still another embodiment, the table has a private lock bitmap, representing row locks on the table that are visible only to the transaction being executed internally.

Lock requester 230 requests a set of row locks on rows of the table manipulated by the delete or the update statement to preclude other transactions from deleting or updating the same rows concurrently.

Set operator 240 performs set operations on the lock bitmap to manage the set of row locks associated with the transaction. In an embodiment, the set operations may include binary operations such as NOT, AND, OR or XOR operations. For example, an AND operation may be used to check if there exists a conflict between locks already granted and those wishing to be acquired. If a conflict exists, the locking operation may either abort or wait on the conflict to resolve and then resume acquiring locks. In another embodiment, to register a lock, the OR operation may be used between the set of locks already granted against the set of locks to be acquired. If the locking operation is blocked on a conflict, then an XOR operation may be used to determine which set of locks were made available. In still another embodiment, to release locks, a NOT operation against the transactions private row locks followed by an AND operation on the public bitmap of locks already granted are utilized.

Figure 8:
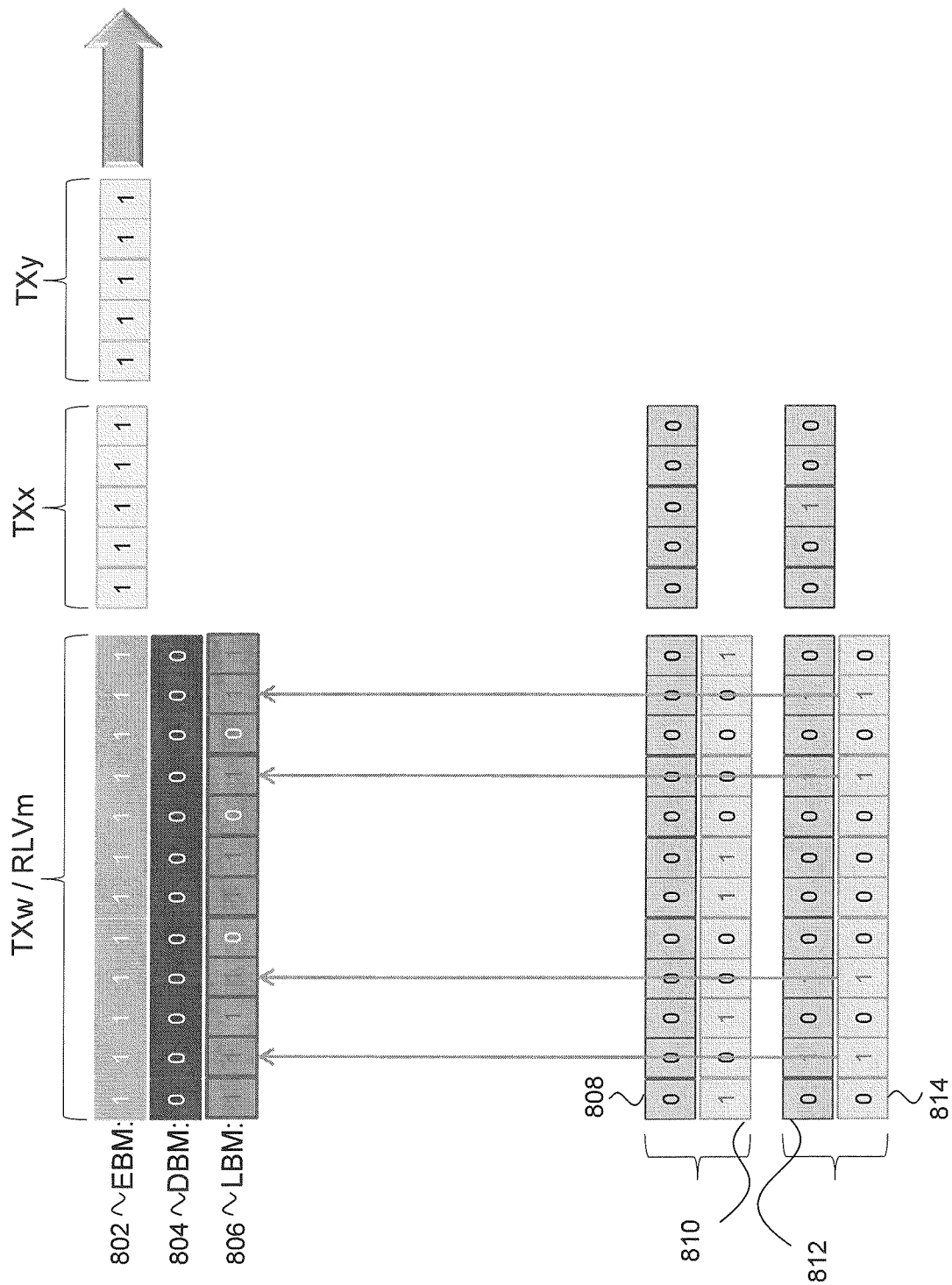

In the above, LBM 806 (corresponding to LBM 806 in FIG. 8 below) illustrates the public row lock bitmap that is public and visible to all transactions. LBM 802 (as illustrated in FIG. 8), records private row locks owned by a transaction such as TXx in FIG. 8.) Further, set A is the global set of row locks on a table that is publically visible to all transactions. B is the set of private row locks already granted for transaction X. To release the locks, the operation (A AND (NOT B)) is applied.

In an embodiment, set operator 240 is further configured to perform an AND operation to detect whether there is conflict between a set of row locks already granted on the table and the set of row locks on the rows qualified by the delete or the update statement. In an embodiment, the set operator is further configured to perform an OR operation between a set of row locks already granted on the table and the set of row locks on the rows qualified by the delete or the update statements to register the set of row locks associated with the transaction.

In an embodiment, set operator 240 is further configured to perform an XOR operation between a set of row locks already granted on the table and the set of row locks on the rows qualified by the delete or the update statements to release the set of row locks associated with the transaction. In an embodiment, the set operator is further configured to perform an XOR operation between a set of row locks already granted on the table and the set of row locks on the rows qualified by the delete or the update statements of the transaction to identify an owner of the set of row locks. In an embodiment, the set operator is further configured to perform the set operations recursively on the lock bitmap to obtain the set of row locks associated with the transaction in one set of operations.

In an embodiment, the table has a public lock bitmaps visible to some or all transactions, and a private lock bitmap visible to the transaction being executed. In an embodiment, the table has a found set bitmap associated with the transaction, which represents the row locks on set of rows qualified by the delete or the update statement of the transaction.

Optionally, embodiments of SOLE 115 may further include additional components as described below. In an embodiment, SOLE 115 may include an error generator that, upon determination that there is conflict between the set of row locks already granted on the table and the set of row locks on the rows qualified by the delete or the update statement, returns an error to an application associated with the transaction.

In an embodiment, SOLE 115 may include a transaction pauser that, upon determination that there is conflict between the set of row locks already granted on the table and the set of row locks on the rows qualified by the delete or the update statement, the subset of non-conflicting row locks use an OR operation to register the subset, waits for conflicting row

| | | | | | | | | | | | | | | | | | |
|---|---|---|---|---|---|---|---|---|---|---|---|---|---|---|---|---|---|
| A. LBM 806 | 1 | 0 | 1 | 1 | 1 | | A => A | 1 | 0 | 1 | 1 | 1 | | | | | |
| B. LBM 802 | 0 | 0 | 0 | 1 | 1 | | NOT B => C | 1 | 1 | 1 | 0 | 0 | | A AND C | 1 | 0 | 1 | 0 | 0 | locks to be released by the owning transaction, and then repeats the lock acquisition process on the remaining subset of locks not acquired.

Two or more of the elements of SOLE 115 shown in FIG. 2 may be configured to run in parallel. Such parallel execution of these elements may increase the efficiency and speed of SOLE 115.

Figure 3:
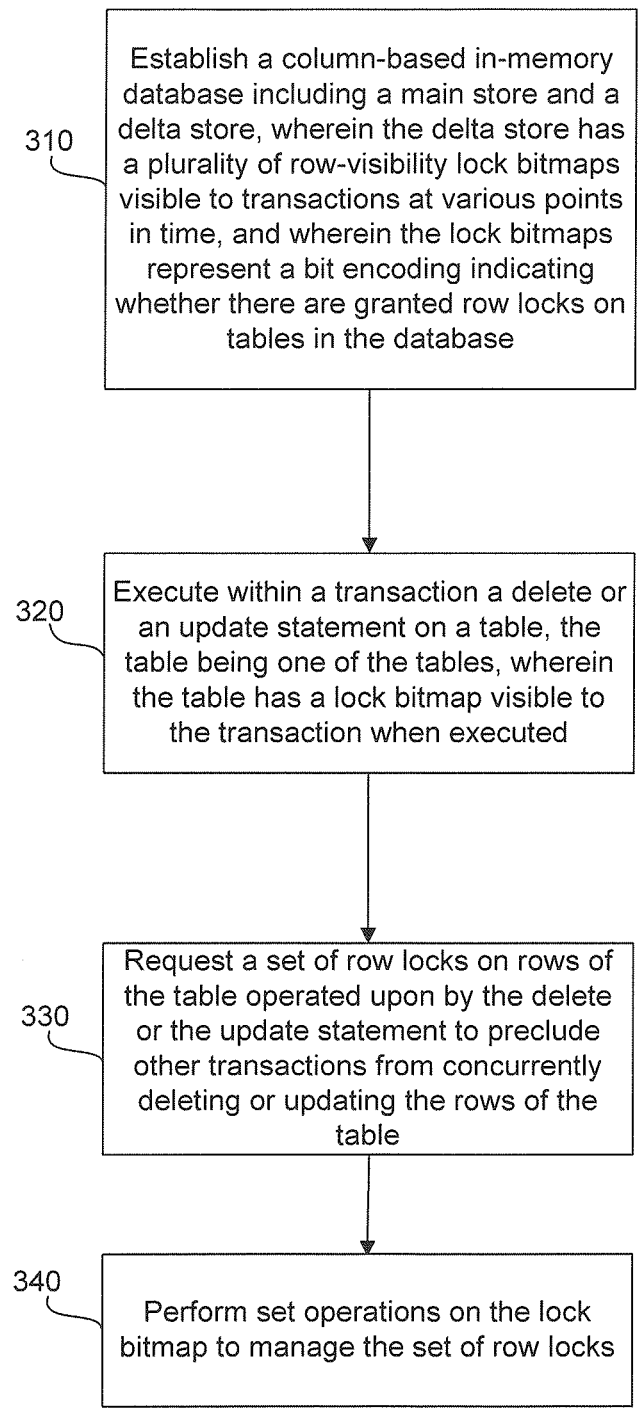
FIG. 3 is a flowchart for a method for a set-oriented locking mechanism using in-memory bitmap, according to an embodiment.

FIG. 3 is a flowchart for a method for a set-oriented locking mechanism using in-memory bitmap, according to an embodiment. For ease of explanation, method 300 will be described with reference to SOLE 115 of FIG. 2 that is in server 110, as described above. However, method 300 is not intended to be limited to this example embodiment.

At stage 310, a column-based in-memory database is established, which includes a main store and a delta store. In an embodiment, the delta store has a plurality of row-visibility lock bitmaps visible to transactions at various points in time.

In another embodiment, the lock bitmaps represent a bit encoding to indicate whether there are granted row locks on rows of tables in the database. For example, in an embodiment, database establisher 210 may establish the main store and the delta store of the column-based in-memory database.

At stage 320, a delete or an update statement on a table is executed within a transaction. In an embodiment, the table has a lock bitmap visible to the transaction at time of execution. This lock bitmap may be a private lock bitmap tracking row locks on the rows manipulated by the transaction and may be visible only to the transaction internally. For example, in an embodiment, transaction executor 220 may execute a delete or an update statement within the transaction.

At stage 330, a set of row locks are requested on rows of the table manipulated by the delete or the update statement to preclude other transactions from deleting or updating the same rows concurrently. For example, in an embodiment, lock requestor 230 may request a set of row locks on the table to be manipulated by the delete or the update statement of the transaction.

At stage 340, set operations are performed on the lock bitmap to manage the set of row locks associated with the transaction. For example, in an embodiment, set operator 240 may perform set operations on the lock bitmap associated with the transaction. Certain details of stages 310-340 are illustrated in FIGS. 4-9 and described below. In some embodiments, stages 320-340 may be applied to a row-oriented data store.

Figure 4:
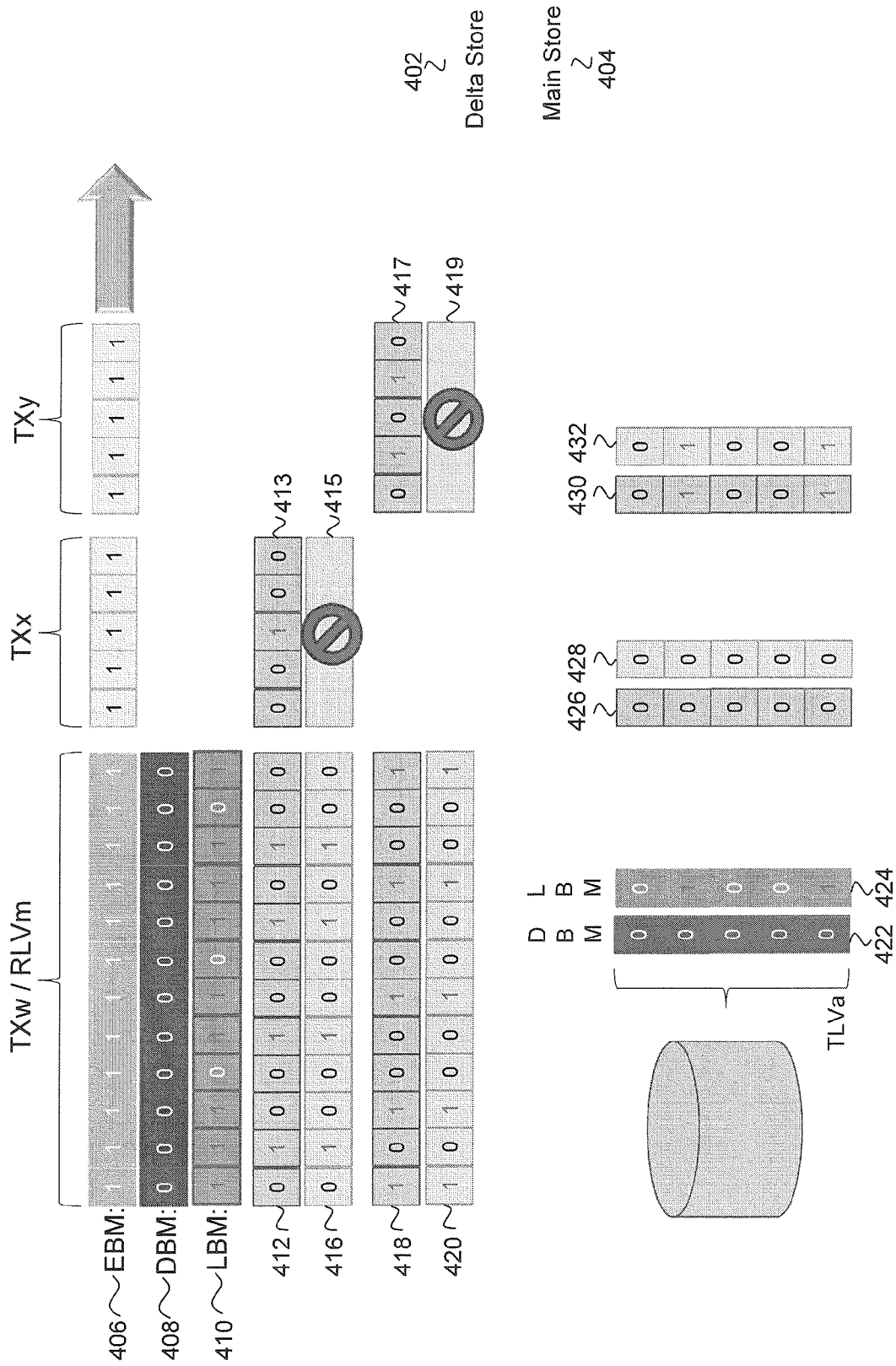
FIGS. 4-9 depict lock bitmaps implementing set-oriented locking mechanisms, according to various embodiments.

FIG. 4 depicts lock bitmaps implementing set-oriented locking mechanism, according to an embodiment. In this example, an in-memory data store may contain a main store 402 and delta store 404. The delta store 404 further includes bitmaps existence bitmap (EBM) 406, which records the corresponding rows in a delta store portion of a table; a delete bitmap (DBM) 408 which records the deleted rows in the delta store portion of a table; and a lock bitmap (LBM) 410 which records the granted row locks on the table. In an embodiment, EBM 406, DBM 408 and LBM 410 are public, because they are visible to transactions TXw, TXx and TXy. EBM 406, DBM 408 and LBM 410 may have a corresponding main portions bitmaps EBM (not shown), DBM 422, and LBM 424 in main store 404.

In an embodiment, the union of the in-memory delta store portion and the main portion of the bitmaps provides a definition of the table. For example, TLVa portion of the EBM in main store 404 and EBM 406 in the delta store 402 represent the definition of the table. When a query is executed, the corresponding rows qualified by the WHERE clause of the update or delete statement may exist either in the delta store EBM 406 or TLVa store EBM (not shown). In the event that the delete or update statement attempts to manipulate certain rows in the table, row locks should be obtained and recorded in the corresponding LBM 410. If the transaction involves locking multiple rows in the entire table, the transaction may need to consider LBM 410 in the delta store 402 and LBM 424 in the main store 404.

In an embodiment, the set-based locking mechanism may efficiently lock a large number of rows in one set of operations. The embodiments may be useful for in-memory stores.

In an embodiment, DBM 412 and LBM 416 are private bitmaps associated with transaction TXx, which record the row visibility and row locks for transaction TXx internally. For example, LBM 416 tracks which rows need to be locked based on the delete or update statement of the transaction TXx. Bitmaps EBM 413 and LBM 415 record rows that are visible to TXx only, such as the new rows inserted by transaction TXx, but not committed yet. Accordingly, in an embodiment, these rows may only be visible internally to transaction TXx and as such may subsequently modify them without requiring any row-level locks.

In this example of FIG. 4, transaction TXx attempts to delete the 2, 5, 8 and $10^{th}$ rows in the delta store (as indicated by LBM 416), and no row in the main store (as indicated by LBM 428). In addition, TXx attempts to delete the $3^{rd}$ row relative to its private EBM 413. Notably, no lock on the row in LBM 415 is necessary, because such row is only visible to TXx and no other transaction may access or manipulate it.

Likewise, DBM 418 and LBM 420 are private bitmaps associated with transaction TXy, which record the row visibility and row locks for transaction TXy internally. For example, LBM 420 tracks which rows should be locked based on the delete or update statement of the transaction TXy Bitmaps EBM 417 and LBM 419 record rows that are visible to TXy only, such as the new rows inserted by transaction TXy, but not committed yet. So these rows may only be visible internally to transaction TXy.

In an embodiment, transaction TXy attempts to delete the 1, 3, 6, 9, and 11th rows from delta store (as indicated by LBM 420) and 1, 4th rows from main store (as indicated by 432). LBM 410 may be a union of LBMs 416 and 418. As illustrated in this example, the rows transactions TXx and TXy wish to delete are in the union of 412 and 418 for the delta store portion and the union of LBMs 426 and 430 in the main store portion. Because there is no row conflict in these LBMs, there is no lock conflict between these two transactions. Transactions TXx and TXy may be executed independently and concurrently without interference of each other. This embodiment illustrates a case for a union or an AND operation between LBM 416 and 420 to generate LBM 410 to detect that there are no duplicate rows requesting the same lock.

Figure 5:
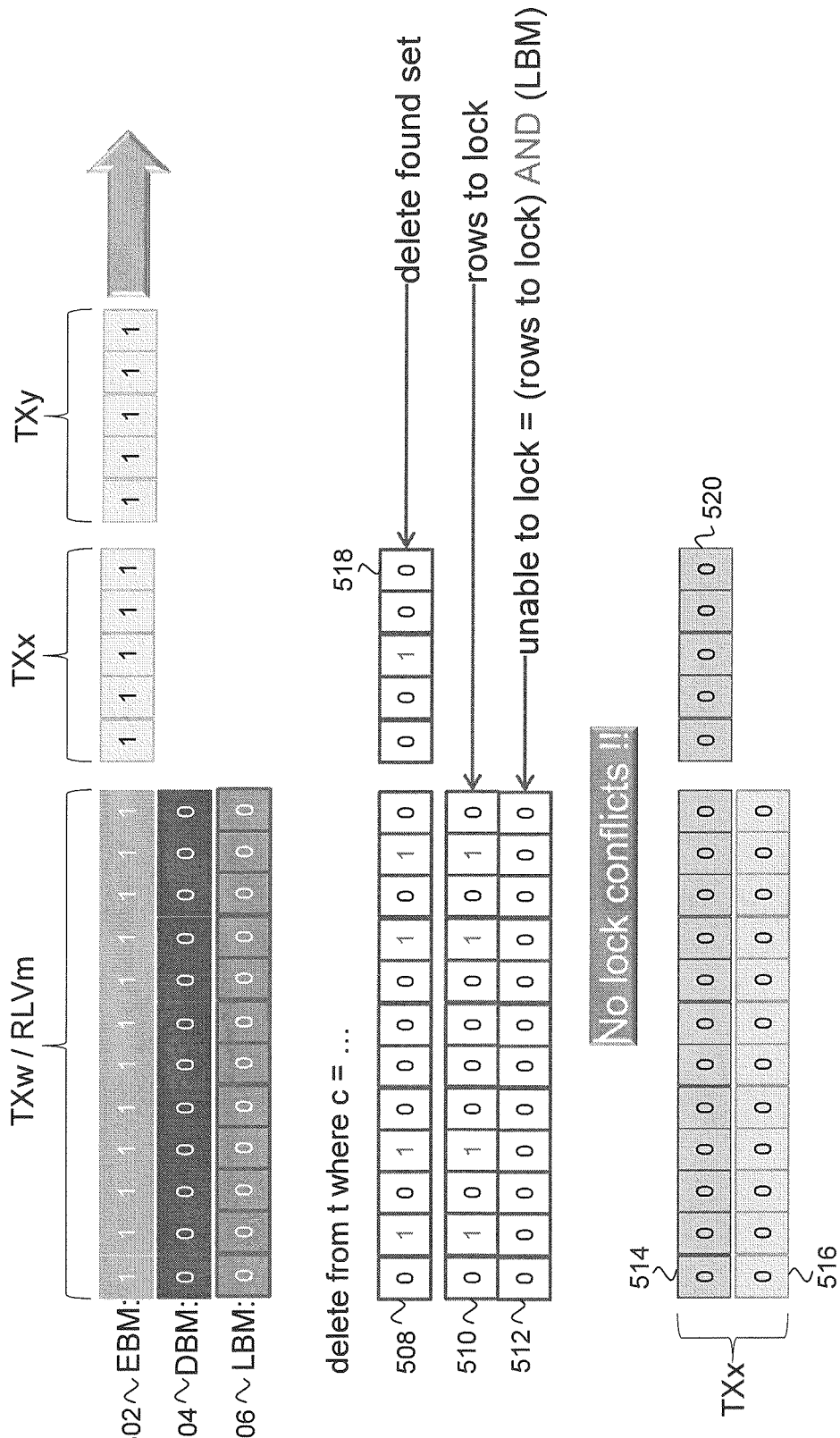

FIG. 5 depicts lock bitmaps implementing set-oriented locking mechanism, according to an embodiment. In this example, when transactions TXx and TXy start concurrently. However, for the purposes of the illustration, the actions of TXx are explained. The bitmaps visible to both transactions may be EBM 502, DBM 504 and LBM 506, with corresponding rows in these bitmaps visible to both transactions. Transaction TXx issues a statement "delete from t where c= . . . " and the where clause qualifies the rows that TXx wishes to delete. The server 110 may deduce that the where clause resolves into 5 rows, with 4 rows in DBM 508 and one row in DBM 518. As a result, the union of DBMs 508 and 518 may show the rows TXx wishes to delete, which may constitute the "delete found set." As noted, because the rows in DBM 518 are only visible to TXx internally, no lock need to be obtained for the rows in DBM 518. Thus, removing DBM 518 from the "delete found set" may generate rows to lock LBM 510.

In an embodiment, the server 110 may determine whether there is any row on the table that TXx is unable to lock due to a lock conflict. Specifically, this inquiry may be implemented using an AND operation. For example, an unable to lock LBM 512 may be generated based on an AND operation between the rows to lock LBM 510 (indicating rows TXx wishes to lock) and LBM 506 (indicating granted row locks on the table).

In an embodiment, unable to lock LBM 512 may show if there are any rows that the server is unable to lock, because the server applies set based locking technology to in-memory bitmaps with high efficiency. Here, there are 12 rows shown in the bitmaps for example purposes. But a table may contain several hundred millions of rows (or more) and the result of this AND operation may indicate the status of the rows to be locked by TXx in one operation. In an embodiment, the result of the AND operation between LBMs 510 and 506 indicates that there is no entry in unable to lock LBM 516, meaning there is no lock conflict for the execution of TXx.

Figure 6:
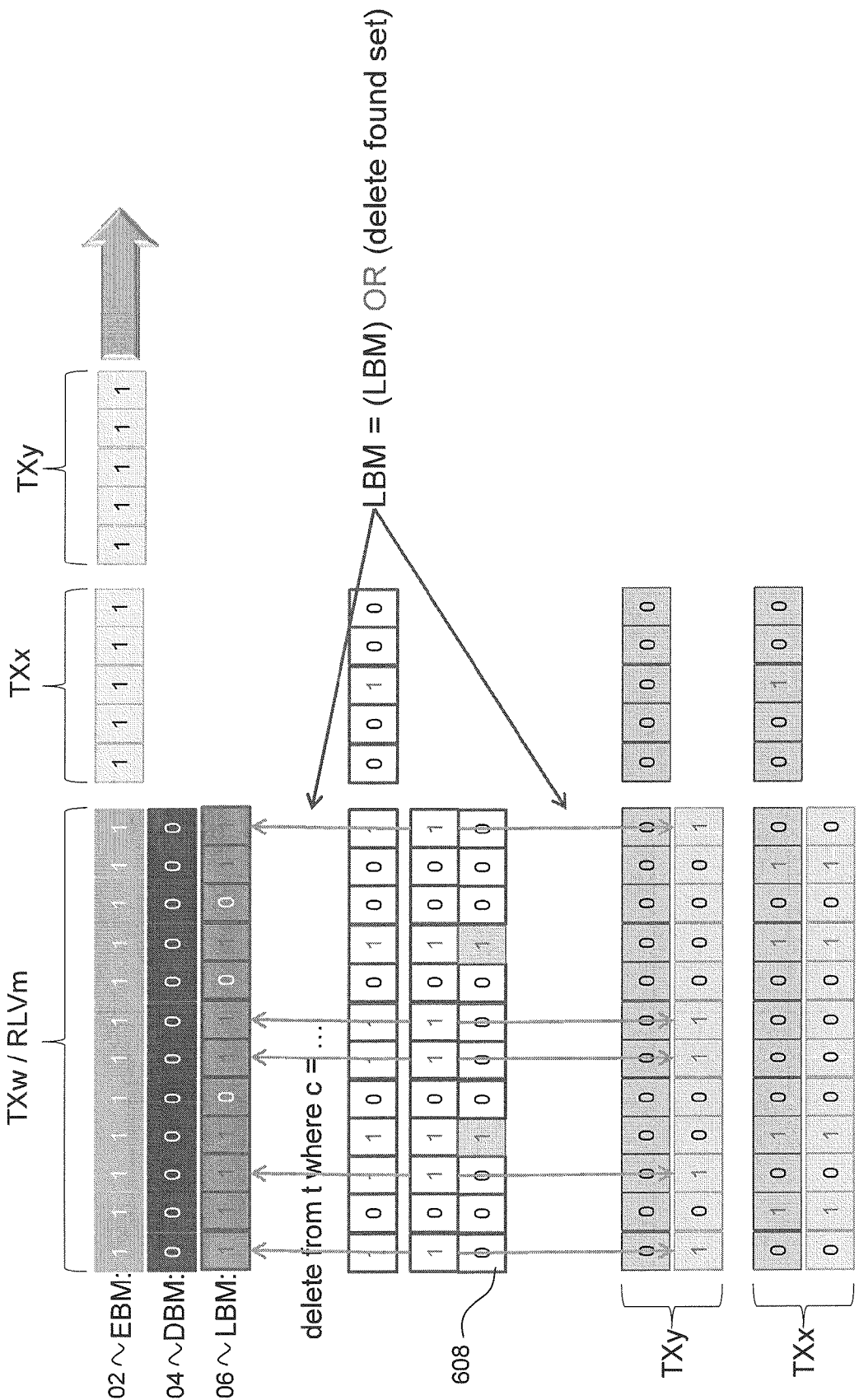

FIG. 6 depicts lock bitmaps implementing set-oriented locking mechanism, according to an embodiment. In an embodiment, for the rows that the server 110 determines there is no lock conflict, the row locks that TXx wishes to obtain may be registered with LBM 606 using an OR operation. For example, the row locks of TXx may be registered using an OR operation between LBM 606 and delete found set to generate an updated LBM 606, which records all granted locks including the row locks newly obtained by TXx.

Figure 7:
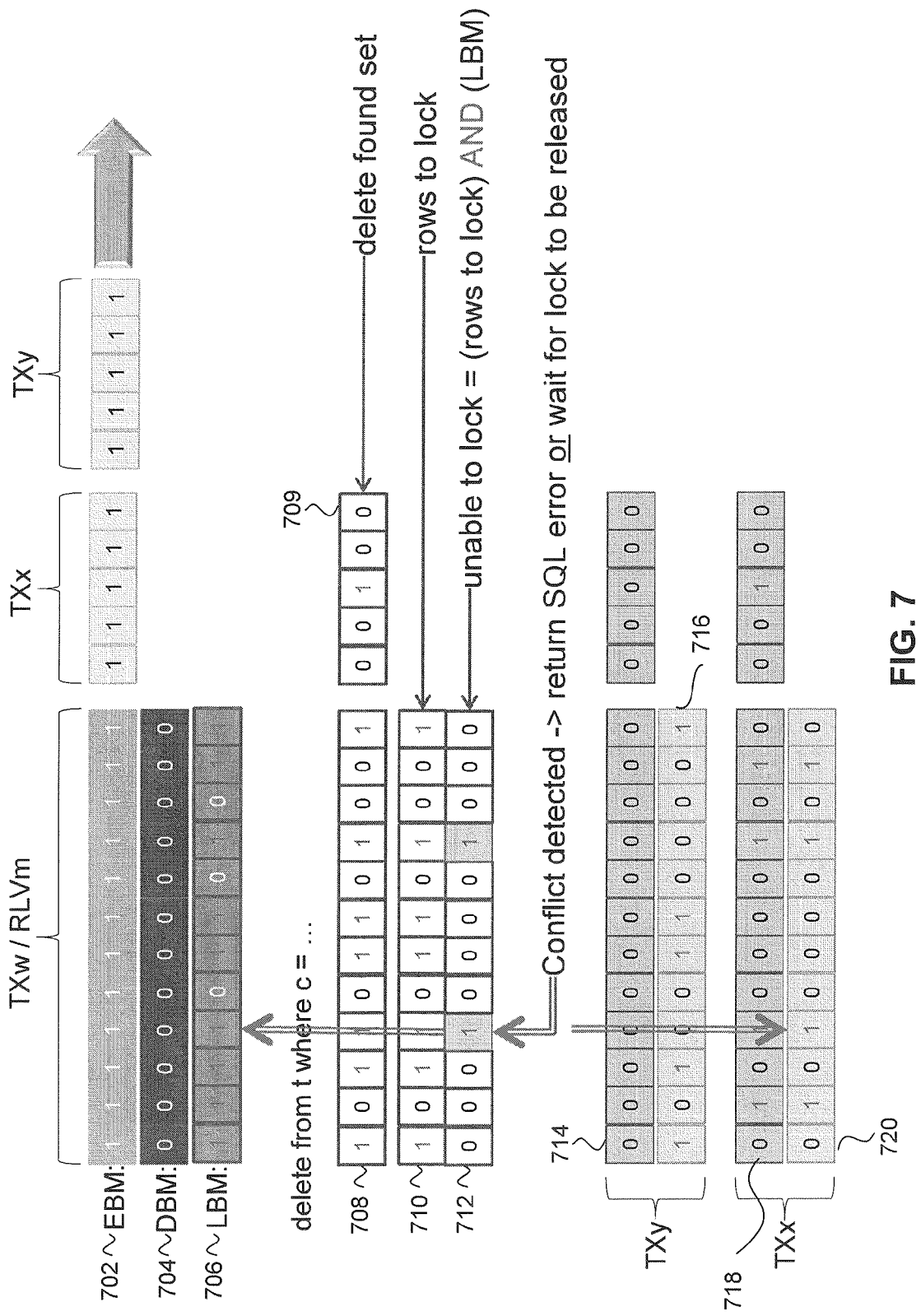

In another embodiment, for the rows that the server 110 determines there are lock conflicts (such as indicated in row 4 and 9 of LBM 608), the resolution of the conflicts carries onto FIG. 7.

FIG. 7 depicts lock bitmaps implementing set-oriented locking mechanism, according to an embodiment. In this example, transactions TXx and TXy are executed concurrently. For transaction TXy, the server 110 deduces that the rows to be deleted by TXy are rows 1, 3, 4, 6, 7, 9, 12, as indicated by row-to-lock bitmap 710. At this point, LBM 706 may already have the rows that have been locked by other transactions. But LBM may not indicate the owner of these row locks. In an embodiment, LBM 716 may indicate which rows are locked by TXx in LBM 720. In another embodiment, an AND operation may be performed between LBM 706 and LBM 720 to indicate which rows are locked by TXx.

In an embodiment, in executing delete found set (LBM 708) of TXy, the server 110 computes the rows to lock LBM 710 by TXy, then it computes unable to lock rows LBM 712 by TXy via an AND operation: LBM=(rows to lock) AND (LBM). For example, as indicated in unable to lock rows LBM 712, at least the 4th and 9th rows are in unable to lock BM 712, indicating transactions other than TXy that have a lock on those rows.

However, TXy was able to obtain row locks on rows 1, 3, 6, 7 and 12, as there is no conflict. The row locks of TXy may be recorded in LBM 716 of TXy. On rows 4 and 9, TXy was unable to obtain the lock due to the lock conflict. In an embodiment, because there may be entries in unable to lock LBM 712, which indicates conflicts, there are two options: 1) return a SQL error to the corresponding transaction and roll back the transaction, which may automatically release the lock; or 2) wait for the lock to be released.

FIG. 8 depicts lock bitmaps implementing set-oriented locking mechanism, according to an embodiment. In an embodiment, assuming a lock conflict has been detected, and TXx rolls back, row locks held by TXx may be released from LBM 806 using an NOT and AND set operation, as noted above. For example, a NOT operation is first performed on TXx private LBM 814, followed by an AND operation between private LBM 814 and global LBM 806, which results LBM 906 (illustrated in detail in FIG. 9.) Accordingly, TXy may proceed to obtain locks after the lock conflict is resolved.

Figure 9:
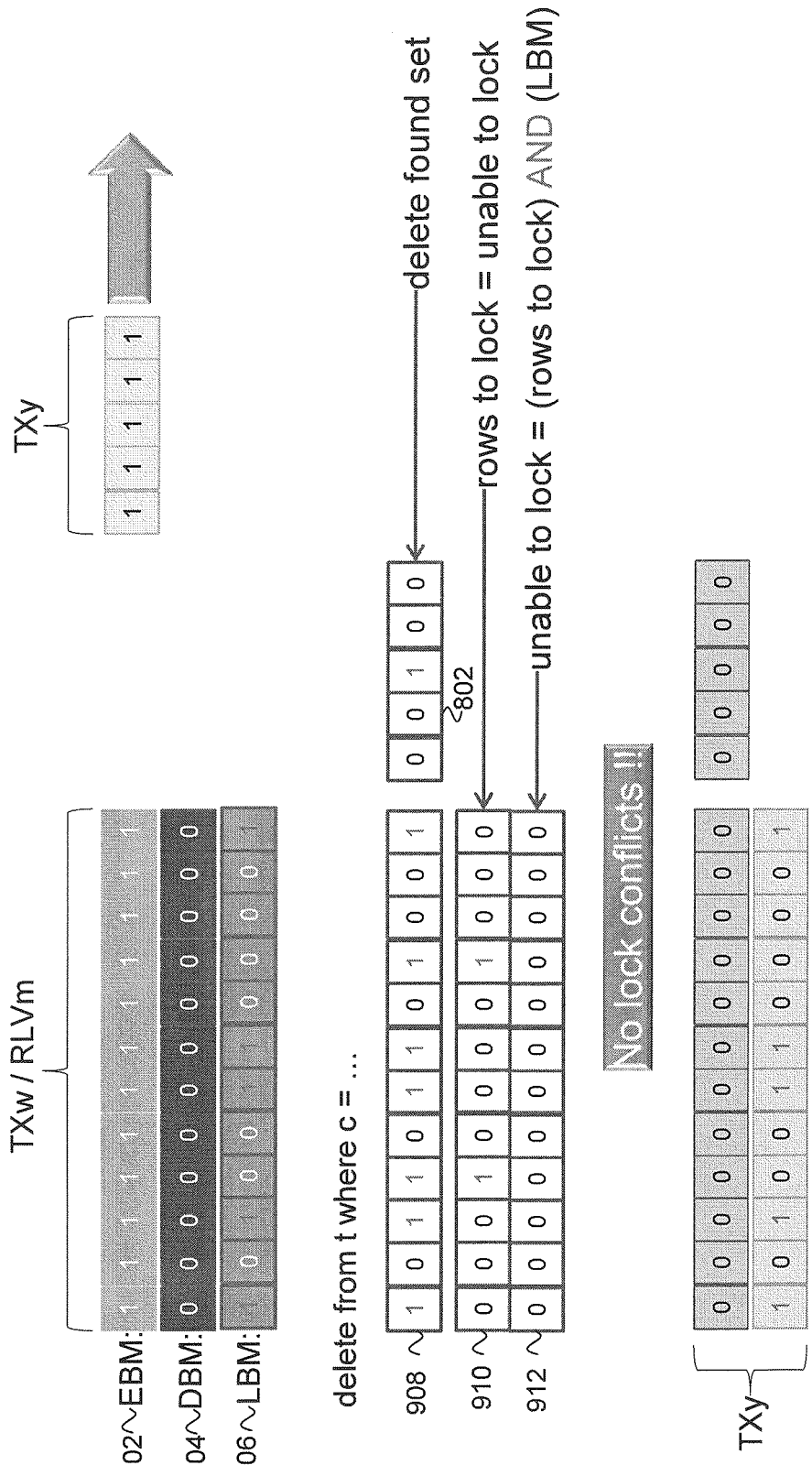

FIG. 9 depicts lock bitmaps implementing set-oriented locking mechanism, according to an embodiment. In this example, TXy decides to wait for TXx to release the row locks and TXy unblocks TXx. Continued from FIG. 8, in an embodiment, as TXx releases the row locks back to LBM 906. Thus, the row lock conflicts detected in LBM 712 of FIG. 7 have been cleared and TXy may operate on LBM 906 to obtain the corresponding row locks.

In an embodiment, rows to lock LBM 910 may equal to unable to lock LBM 912 which include rows 4 and 9. However, since TXy waits for the row locks to be released, there is no conflict. In an embodiment, when TXx releases the corresponding row locks and unblocks, the server may apply the remaining two rows 4 and 9 to LBM with an OR operation: LBM=(LBM) OR (delete found set) to register the row locks of TXy to LBM 906.

As noted above, in an embodiment, to compute the rows to be locked, the server 110 may perform an AND operation to check if there is lock conflict. The server 110 may apply the OR operation between the global LBM and the private transaction LBM to register the row locks to the global LBM. The algorithm may repeat recursively. The removal of the lock may also be a set based operations, such as NOT and AND operations. An example recursive algorithm is further illustrated in the pseudo code below:

- GetDeleteLocks( BM del_fset)
  - BM unableToLock = { }
  - BM rowsToLock = del_fset;
  - Do
    - LockRowSet( rowsToLock, unableToLock );
    - If( unableToLock.IsEmpty( ) ) return GOT_ALL_LOCKS;
    - LockSingleRow( unableToLock.GetFirstRid( ) )
    - // Will block if necessary.
    - If ok then unableToLock.ClearBit(unableToLock.GetFirstRid( ) )
    - // Encapsulate a NOT and AND operations
    - If failed throw locking error
  - rowsToLock = unableToLock;
- While( unableToLock.HasBits( ) )

Figure 10:
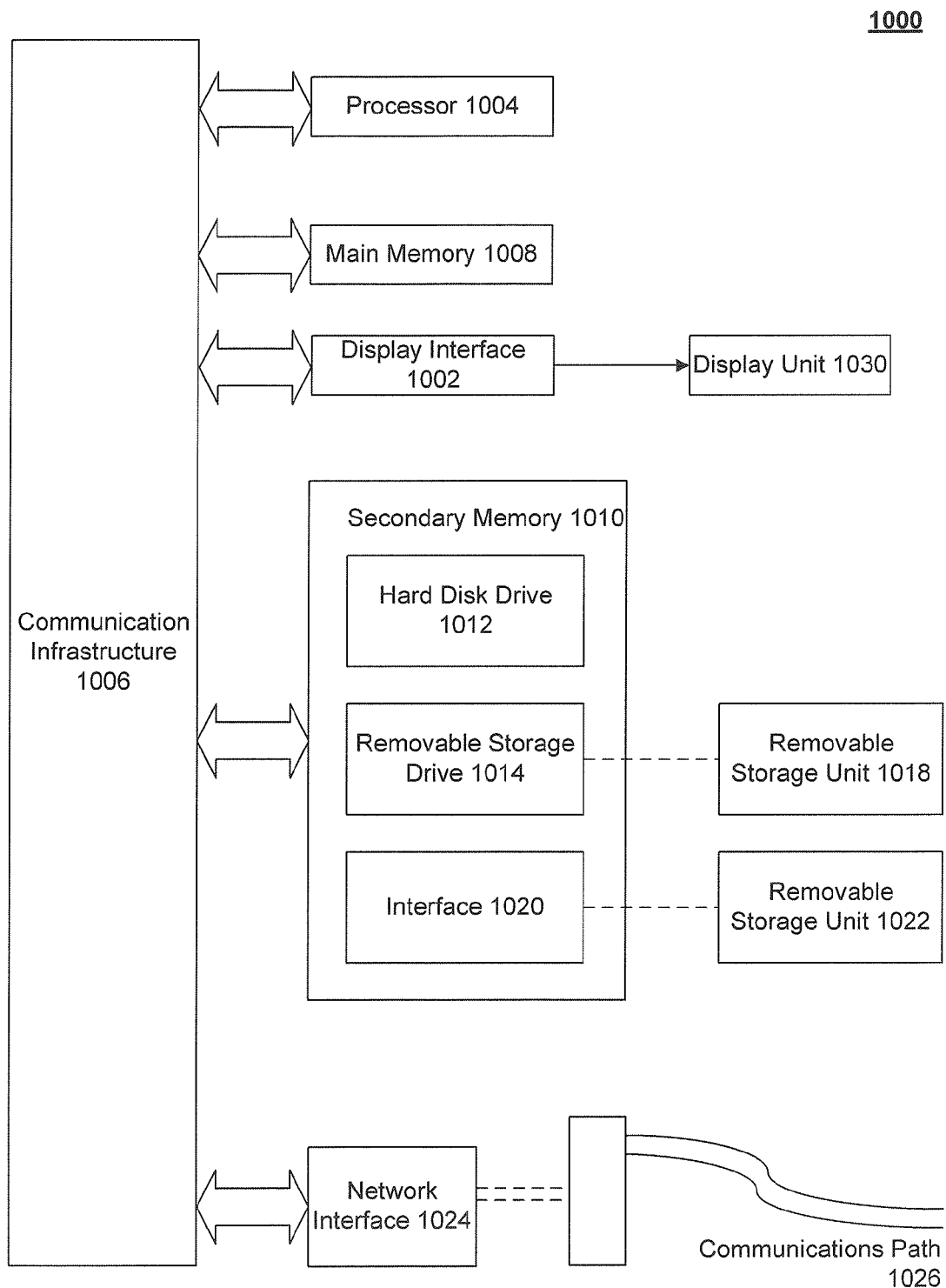
FIG. 10 is a diagram of an example computer system in which embodiments can be implemented, according to an embodiment.

Various embodiments described here can be implemented, for example, using one or more well-known computer systems, such as computer system 1000 shown in FIG. 10. Computer system 1000 can be any well-known computer capable of performing the functions described herein.

Computer system 1000 includes one or more processors (also called central processing units, or CPUs), such as a processor 1004. Processor 1004 is connected to a communication infrastructure or bus 1006.

One or more processors 1004 may each be a graphics processing unit (GPU) (not shown). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 1000 also includes user input/output device(s) 1030, such as monitors, keyboards, pointing devices, etc., which communicate with communication infrastructure 1006 through user input/output interface(s) 1002.

Computer system 1000 also includes a main or primary memory 1008, such as random access memory (RAM). Main memory 1008 may include one or more levels of cache. Main memory 1008 has stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/or any other computer data storage device. Removable storage drive 1014 reads from and/or writes to removable storage unit 1018 in a well-known manner.

According to an exemplary embodiment, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. For example, communication interface 1024 may allow computer system 1000 to communicate with remote devices over communications path 1026, which may be wired and/or wireless, and which may include any combination of LANs, WANs, the Internet, etc. Control logic and/or data may be transmitted to and from computer system 1000 via communication path 1026.

In an embodiment, a tangible apparatus or article of manufacture comprising a tangible computer useable or readable medium having control logic (software) stored thereon is also referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 10. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method for a database system, comprising:
    establishing a column-based in-memory database including a main store and a delta store, wherein the delta store has a plurality of row-visibility lock bitmaps visible to transactions at various points in time, and wherein the lock bitmaps represent a bit encoding indicating whether there are granted row locks on tables in the database;
    executing within a transaction a delete or an update statement on a table, the table being one of the tables, wherein the table has a lock bitmap visible to the transaction when executed;
    requesting a set of row locks on rows of the table operated upon by the delete or the update statement to preclude other transactions from concurrently deleting or updating the rows of the table;
    performing set operations on the lock bitmap to manage the set of row locks.

2. The method of claim 1, wherein the performing comprises:
    performing an AND operation to detect whether there is conflict between a set of row locks already granted on the table and the set of row locks.

3. The method of claim 2, further comprising:
    upon determining there is conflict between the set of row locks already granted on the table and the set of row locks, waiting for conflicting row locks to be released; and
    performing an OR operation to register the set of row locks after the conflicting row locks are released.

4. The method of claim 1, wherein the performing comprises:
    performing an OR operation between a set of row locks already granted on the table and the set of row locks to register the set of row locks for the transaction.

5. The method of claim 1, wherein the performing comprises:
    performing a NOT and AND operations between a set of row locks already granted on the table and the set of row locks to release the set of row locks from the transaction.

6. The method of claim 1, wherein the performing comprises:

performing a NOT and AND operations between a set of row locks already granted on the table and the set of row locks to identify an owner of the set of row locks.

7. The method of claim 1, wherein the performing comprises:
executing the performing recursively to obtain a set of row locks for the transaction.

8. A system, comprising:
a memory; and
at least one processor coupled to the memory and configured to execute a plurality of modules, the modules comprising:
a database establisher, configured to establish a column-based in-memory database including a main store and a delta store, wherein the delta store has a plurality of row-visibility lock bitmaps visible to transactions at various points in time, and wherein the lock bitmaps represent a bit encoding indicating whether there are granted row locks on tables in the database;
a transaction executor, configured to execute within a transaction a delete or an update statement on a table, the table being one of the tables, wherein the table has a lock bitmap visible to the transaction when executed;
a lock requestor, configured to request a set of row locks on rows of the table operated upon by the delete or the update statement to preclude other transactions from concurrently deleting or updating the rows of the table; and
a set operator, configured to perform set operations on the lock bitmap to manage the set of row locks.

9. The system of claim 8, wherein the set operator is configured to:
perform an AND operation to detect whether there is conflict between a set of row locks already granted on the table and the set of row locks.

10. The system of claim 9, further comprising:
a transaction pauser, upon determining there is conflict between the set of row locks already granted on the table and the set of row locks, configured to wait for conflicting row locks to be released; and
the set operator, configured to perform an OR operation to register the set of row locks after the conflicting row locks are released.

11. The system of claim 8, wherein the set operator is configured to:
perform an OR operation between a set of row locks already granted on the table and the set of row locks to register the set of row locks for the transaction.

12. The system of claim 8, wherein the set operator is further configured to:
perform a NOT and AND operations between a set of row locks already granted on the table and the set of row locks to release the set of row locks from the transaction.

13. The system of claim 8, wherein the set operator is further configured to:
performing a NOT and AND operations between a set of row locks already granted on the table and the set of row locks to identify an owner of the set of row locks.

14. The system of claim 8, wherein the set operator is further configured to:
perform the set operations recursively to obtain the set of row locks for the transaction.

15. A computer program product comprising a computer readable storage medium having instructions encoded thereon that, when executed by a processor, cause the processor to perform operations comprising:
establishing a column-based in-memory database including a main store and a delta store, wherein the delta store has a plurality of row-visibility lock bitmaps visible to transactions at various points in time, and wherein the lock bitmaps represent a bit encoding indicating whether there are granted row locks on tables in the database;
executing within a transaction a delete or an update statement on a table, the table being one of the tables, wherein the table has a lock bitmap visible to the transaction when executed;
requesting a set of row locks on rows of the table operated upon by the delete or the update statement to preclude other transactions from concurrently deleting or updating the rows of the table;
performing set operations on the lock bitmap to manage the set of row locks.

* * * * *